United States Patent
Prest

(10) Patent No.: US 10,068,154 B2
(45) Date of Patent: Sep. 4, 2018

(54) RECOGNITION PROCESS OF AN OBJECT IN A QUERY IMAGE

(71) Applicant: Logograb Limited, Dublin (IE)

(72) Inventor: Alessandro Prest, Zurich (CH)

(73) Assignee: LOGOGRAB LIMITED, Dublin (IE)

( * ) Notice: Subject to any disclaimer, the term of this patent is extended or adjusted under 35 U.S.C. 154(b) by 7 days.

(21) Appl. No.: 14/907,904

(22) PCT Filed: Aug. 13, 2013

(86) PCT No.: PCT/EP2013/066939
§ 371 (c)(1),
(2) Date: Jan. 27, 2016

(87) PCT Pub. No.: WO2015/022020
PCT Pub. Date: Feb. 19, 2015

(65) Prior Publication Data
US 2016/0162758 A1    Jun. 9, 2016

(51) Int. Cl.
*G06K 9/62*    (2006.01)
*G06K 9/46*    (2006.01)
(Continued)

(52) U.S. Cl.
CPC ......... *G06K 9/6256* (2013.01); *G06K 9/4676* (2013.01); *G06K 9/52* (2013.01);
(Continued)

(58) Field of Classification Search
None
See application file for complete search history.

(56) References Cited

U.S. PATENT DOCUMENTS

2013/0148881 A1\* 6/2013 Xue ............... G06K 9/6256
                                              382/159

OTHER PUBLICATIONS

International Search Report & Written Opinion in PCT/EP2013/066939 dated Feb. 10, 2014.

\* cited by examiner

*Primary Examiner* — Fred Hu
(74) *Attorney, Agent, or Firm* — Manelli Selter PLLC; Edward J. Stemberger

(57) ABSTRACT

Recognition process (1) of an object (An) in a query image (2), performing a training step (6) that comprises: —providing (20) a set of training images (Ti), each training image (Ti) comprising an object tag (LOGOi); —determining (21) for each training image (Ti) of said set a plurality of first descriptors (11), each first descriptor (11) being a vector that represents pixel properties in a subregion (Sri) of the associated training image (Ti); —determining (23) a group of exemplar descriptors (111) describing the set of training images (Ti) and resulting from a selection of the first descriptors (11) based on the position of said subregion (Sri) in the associated training image (Ti) and on the pixel properties of said first descriptors (11); performing a query step (7) comprising: —receiving (30) the query image (2) and defining (31) a plurality of vectors (V') of second descriptors (3) describing the properties of said query image (2); —determining (35) a visual similarity coefficient based on a comparison between each one of said second descriptor (3) of said query image (2) and each one of said exemplar descriptors (111) of said group in order to automatically recognize the object (An) in said query image (2) with respect to the object tag (LOGOi) coupled to one of said exemplar descriptor (111).

15 Claims, 5 Drawing Sheets

(51) Int. Cl.
    *G06K 9/52*         (2006.01)
    *G06T 7/60*         (2017.01)
    *G06T 7/73*         (2017.01)

(52) U.S. Cl.
    CPC ......... *G06K 9/6215* (2013.01); *G06K 9/6267* (2013.01); *G06T 7/60* (2013.01); *G06T 7/73* (2017.01); *G06K 2009/4666* (2013.01); *G06K 2209/25* (2013.01)

RECOGNITION PROCESS OF AN OBJECT IN A QUERY IMAGE

TECHNICAL FIELD OF THE INVENTION

The present invention refers to the field of the object recognition in an image and particularly in images like photos or broadcast videos that comprise one or more objects or frames with commercial information, including e.g. a logo, a brand, a product, a landmark or other commercial features. Preferably, the objects are in two-dimensions.

PRIOR ART

In the field of the object recognition, the recognition of a tag corresponding to a two-dimensions object, as logos, products or landmarks, which exhibit small intra-class variations requires a specific approach.

For detecting an object in an image, it is known to use identifying scale invariant features transformation (SIFT). Typical techniques provide to represent an image as a set of subregions of the image and to use parametric classifiers or local descriptors that capture the appearance of each subregion to define a descriptor space. The set comprises image subregions that are selected in order to cover the whole image using interest point detectors, e.g., Sift vectors, or sampled densely. The space distance of parametric classifiers in the descriptor space reflects visual similarity between the image subregions of the set.

The bag-of-words (BoW) image representation is a technique that requires to partition the descriptor space of the image by a quantizer (e.g. k-means) learned from a subset of local descriptors. By using visual dictionary, local descriptors are coded and in particular matched to a visual word index, i.e. the quantization cell they belong to.

In the BoW technique, subregions are compared via their index and they are deemed similar when they are assigned to the same visual word.

Another technique known as Fisher Vector, that makes reference to a coarser vocabulary, as a dictionary, identifies more than an index per cell in order to extend the encoding and have more information per cell.

In all these techniques, the results are led out by classification and retrieval.

Such techniques advantageous under various aspects present some drawbacks. In fact, the parametric classifiers scale up with the number of classes and, in the same time, the geometric information require geometric layout verification that are computationally expensive.

A known solution provides to create a vector representation by aggregating all the image subregions codes of one image. In this way, according to the BoW technique, a histogram is obtained of the indices assigned to the sampled image subregions included into the set. Thus, an image is embedded in a vector space which allows to evaluate the similarity between images by computing a function such as the cosine similarity.

It is to be observed that the aggregated representations are used for image classifications by learning a parametric model of a class in applications that use, for instance, a support vector machine (SVM).

Another solution, that provides a collection of subregions, is known as inverted lists. In this case, the descriptor codes do not collapse and allow a more precise matching. The solution is used for application as instance-based image retrieval.

These solutions allow to obtain good classification performances starting to the BoW technique but without quantizing descriptors and using an image-to-class distance instead of image-to-image distance, induce class imbalance and not efficiency in computational time and space.

What would be desirable therefore is a process which is operable to detect the presence or the absence of object in a two-dimensions image wherein the object is taken from virtually any direction, and under varying lighting conditions. The proposed process being simple and efficient with respect to the techniques of the prior art.

SUMMARY OF THE INVENTION

According to a first aspect, the present invention addressing the above need provides a recognition process of an object in a query image as defined by claim 1. The preferred embodiments of the process are defined in the dependent claims 2-15.

BRIEF DESCRIPTION OF THE DRAWINGS

Other characteristics and advantages of the invention will be understood from the following description of a preferred embodiment provided in an illustrative way with reference to the attached drawings, wherein.

DETAILED DESCRIPTION

Figures schematically show the steps of a process 1 for an automatic recognition of an object An in a query image 2 by an apparatus, which is not represented. The object An is a two-dimensions image which exhibits small intra-class variations such as, for example, a logo, a brand, a representation of products having particular features.

According to a non-limiting specific application, the process can be used for measuring brand exposure (logos), linking digital information to logos, ensuring shelf compliance in the retail industry (product) or tagging user's photos (landmarks).

The embodiment here below described refers to an automatic recognition of a logo by the apparatus, in a non-limiting specific example.

The process 1 performs a training step 6, wherein the apparatus is trained to automatically learn an object tag LOGOi that is comprised in a set of training images Ti. In particular, the object tag LOGOi is an original logo or an object that is transformed by applying one or more filters to the object tag LOGOi, as will be better described later.

Moreover, the process performs a query step 7, wherein the apparatus receives the query image 2 and automatically recognises the object An that is included.

The training images Ti of the set as well as the query image 2 comprises a plurality of pixels.

Figure 1:
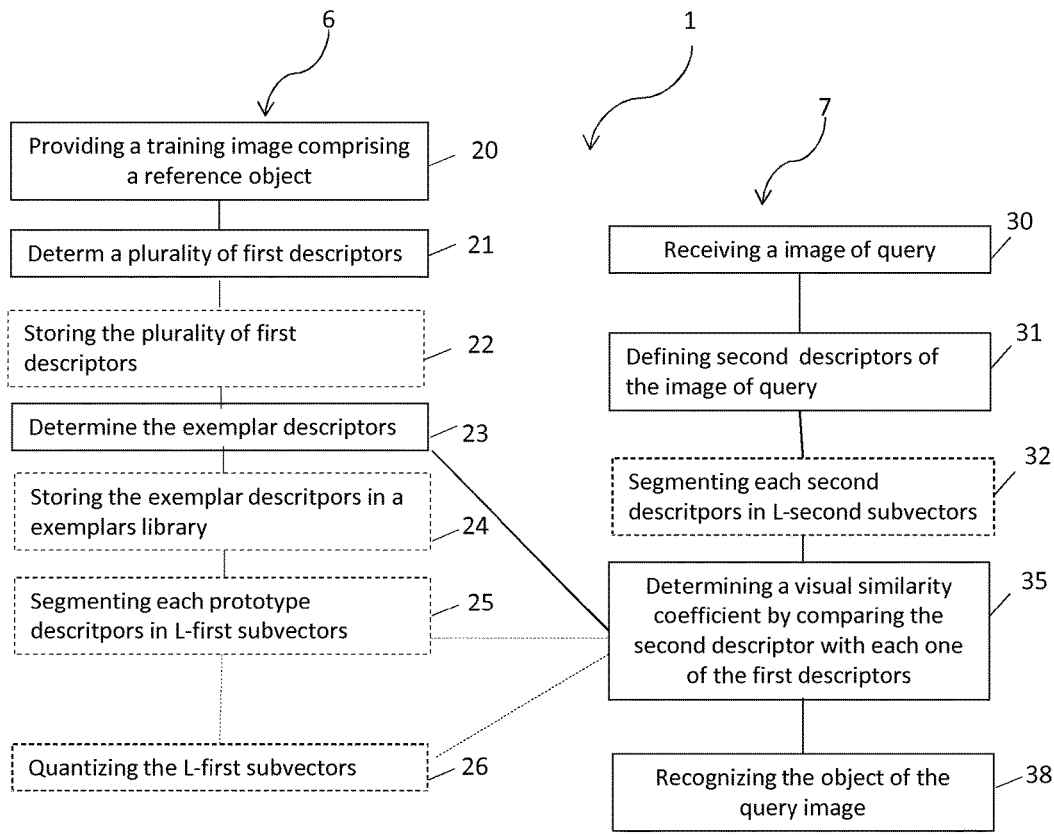
FIG. 1 shows a schematic flow diagram of an embodiment of a process according to the present invention.
Figure 2:
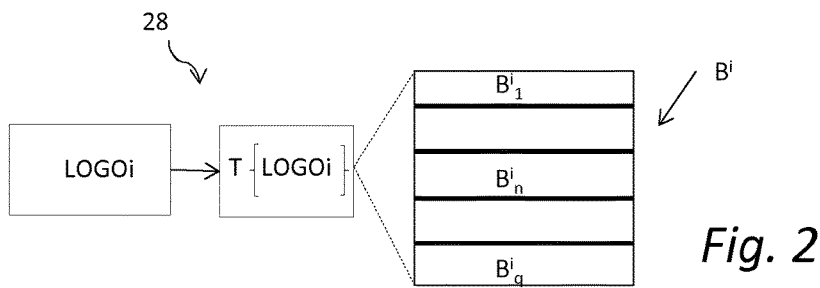
FIG. 2 shows schematically a logo transformation.
Figure 3:
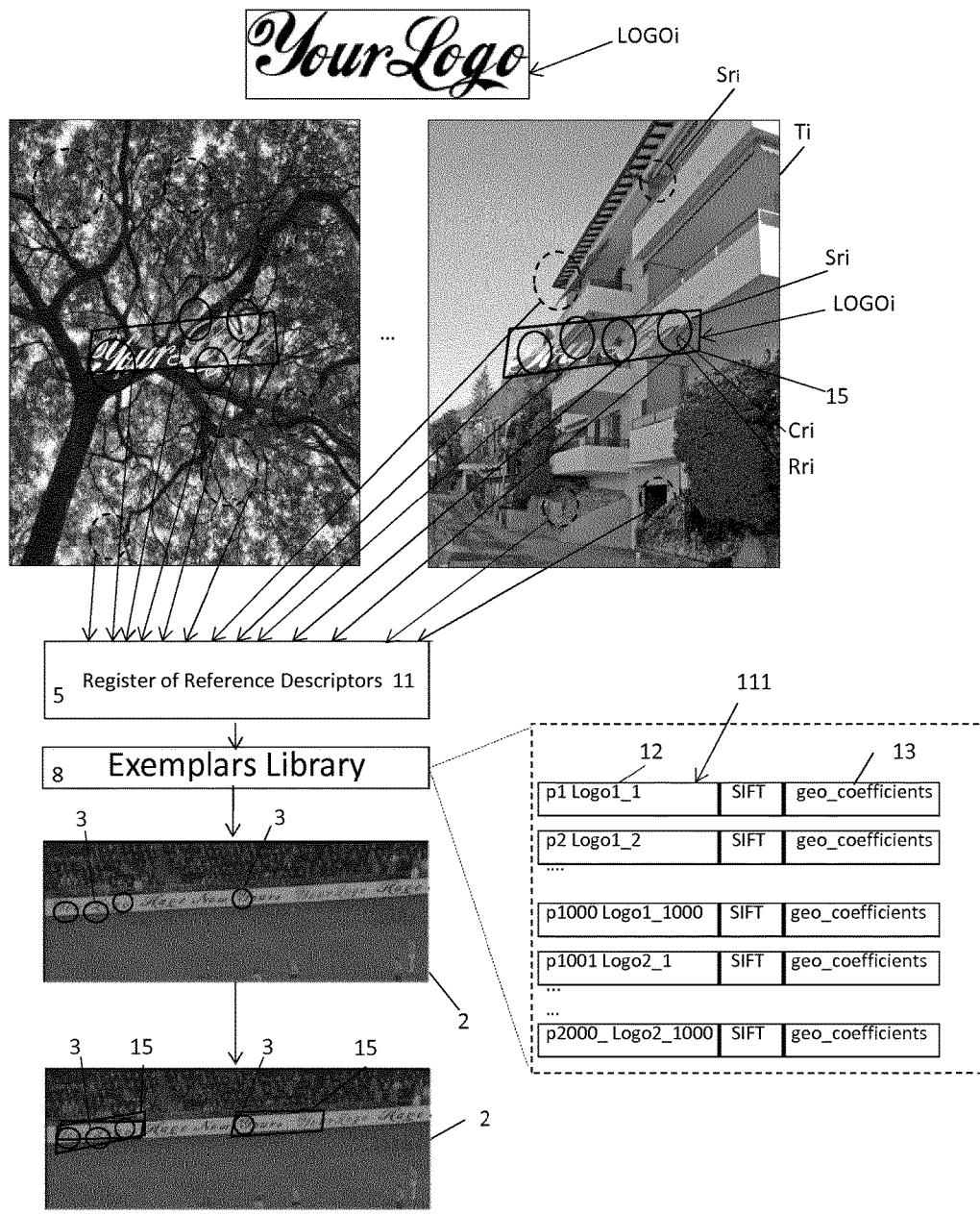
FIG. 3 shows an embodiment of the process according to the flow diagram of FIG. 1.

According to FIGS. 1-3, the training step 6 comprises providing (20) the set of training image Ti, each training image Ti comprising the object tag LOGOi. The training image Ti is learned by determining (21) a plurality of first descriptors 11.

Each first descriptor 11 is a n-dimensions vector V that represents pixels properties in a subregion Sri of the training image Ti, as schematically shown in FIG. 3. For producing the plurality of first descriptors 11 the training image Ti is subdivided into a number of subregions Sri of pixels groups, where each pixel into each subregion Sri has similar or homogeneous data attributes to one another. According to one embodiment, the first descriptors 11 are selected either using interest point detectors or samples sampled densely to cover the whole training image Ti. Each subregion is then identified by a local descriptor that captures the appearance of the subregion, for example by comprising a distribution of pixels in the subregion.

Referring to the embodiment shown in FIG. 3, the subregions Sri are circle areas of pixels that are identified by a centre Cri and a respective radius Rri and wherein the first descriptors 11 are represented by SIFT vectors (Scale Invariant Features Transformation).

The training step 6 further comprises:
determining (23) a group of exemplar descriptors 111 describing the set of training images Ti and resulting from a selection of the first descriptors 11 based on the position of said subregions Sri in the associated training image Ti of the set and on the pixel properties of the first descriptors 11.

In particular, the group of exemplar descriptors 111 provides preferential discrimination of said set of training image Ti.

According to one embodiment, the exemplar descriptors 111 are selected by applying a method that will be described here below.

The process 1 performs a query step 7 comprising:
receiving (30) the query image 2 and defining (31) a plurality of second descriptors 3 that describe the query image 2.

Each second descriptor 3 of said plurality is a n-dimensions vector V', that is defined, accordingly to said first descriptor 11.

Thus, the query step 7 further comprises:
determining (35) a visual similarity coefficient based on the difference in appearance between each second descriptor 3 of said query image 2 and each one of exemplar descriptors 111 of the group. The visual similarity coefficient is determined based on a comparison of each second descriptor 3 with each one of said exemplar descriptors 111 of said group in order to automatically recognize the object An in the query image 2 as the object tag LOGOi coupled to one of said exemplar descriptor 111 of the group.

In one embodiment of the process (1), the training step 6 further comprises:
segmenting (25) the n-dimensions vector V of each exemplar descriptor 111 of said group in predefined L-first subvectors t1, . . . , tL;
and the query step (7) further comprises:
segmenting (32) the n-dimensions vector V' of each one of said second descriptor 3 in predefined L-portions in order to define respective L-second subvectors t'1, . . . , t'L.

Thus, the visual similarity coefficient between each second descriptor 3 and each one of exemplar descriptors 111 of said group results from a simultaneous comparison of each second subvector t'1, . . . , t'L with each one of said first subvectors t1, . . . , tL.

According to an embodiment, the visual similarity coefficient between the second descriptors 3 and the exemplar descriptor 111 is measured as Euclidean distance of the vectors V and V'. Thus, during the training step 6, the segmenting (25) of each exemplar descriptor 11 of said group further comprises:
quantizing (26) separately each one of said L-first subvectors t1, . . . , tL of each vector V in order to generate for each exemplar descriptor 111 a number L of re-lookup tables (P1($t$1), . . . , PL(tL)). This means that each one of the L-first subvectors t1, . . . , tL of J-dimension, is associated to one of $2^J$ possible different centroids.

Advantageously, due to the segmenting (25) of the exemplar descriptors 111 in L-portions and by the segmenting (32) of the second descriptors 3 in L-portions allows to compare, by comparing step (35), the L-portions by means of an access to the look-up tables P1($t$1), . . . , PL(tL) instead of computing the distance between each dimension explicitly, thus reducing the time consumption.

According to an example, if J is 8, the quantized vector is Bi=Pi(ti), the re-lookup table d1, . . . dL generated and associated to one of the L-first subvectors t1, . . . , tL, has sizes (28×28) and contains a number of 65536 pre-computed distances.

Having the quantizing (26) of the L-first subvectors t1, . . . , tL, the visual similarity i.e. the Euclidean distance, between each one of second descriptors 3 and each of the exemplar descriptors 111 of said group, is determined by accessing at the L re-lookup tables in order to identify the second descriptor 3 that correspond with highest precision to at least one of the selected first descriptors 111 stored in the exemplar library 8.

It is noting that the pre-compute re-lookup tables P1($t$1), . . . , PL(tL) which have been defined during the training step 6, already contain the distance between the L-first subvectors t1, . . . , tL of the exemplar descriptors 111 and all possible subvectors. Thus, the Euclidean distance between one of the second descriptor 3 and each one of the exemplar descriptors 111 is calculated by means of L-addition operations, one for each portion of the second descriptor 3.

Figure 4:
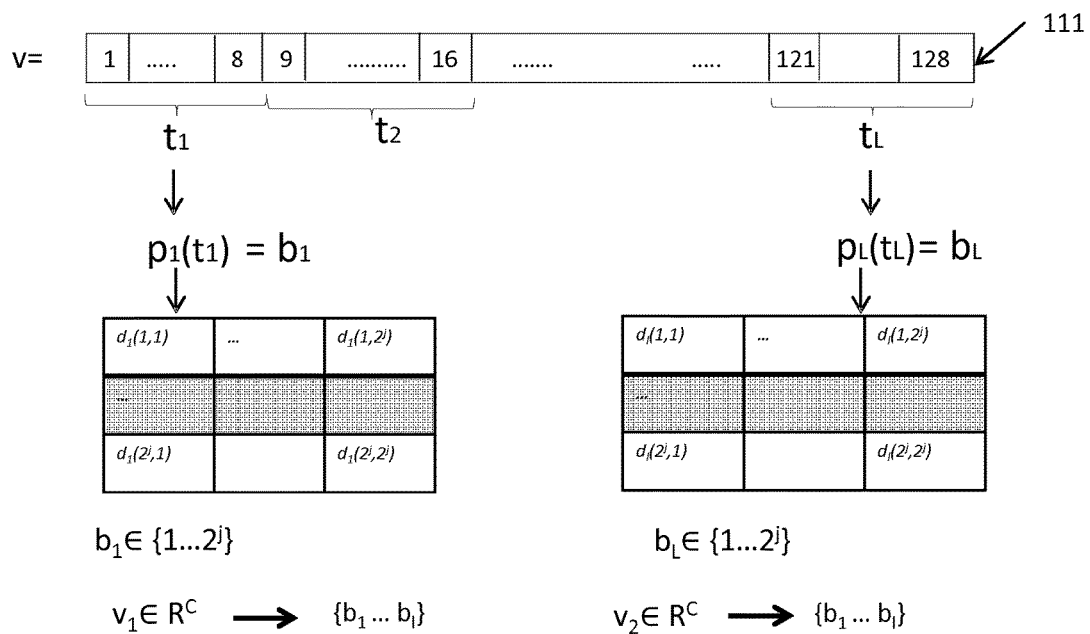
FIG. 4 shows an example of segmenting of a n-dimensions vector, according to the present invention.

For example, as indicated in FIG. 4, considering:
a vector V having a dimension of c=128, belongs to a space $R^C$ having the respective subvectors t1, . . . , tL, wherein each subvector has dimension of (128/L);
each subvector t1, . . . , tL is quantized according to P1($t$1)=b1, . . . , pL(tL)=bL, consequently each quantized subvector bj for j=1 . . . L, is associated to an entry in the re-lookup table dj for j=1 . . . L;
the set of L re-look-up tables is d1, . . . , dL.
Being $[b_1 \in \{1 \ldots 2^J\}, \ldots, b_L \in \{1 \ldots 2^J\}]$
and having two vectors $V_1$ and $V_2$:
$v_1 \in R^C$ of $\{b_1 \ldots b_L\}$
$v_2 \in R^C$ of $\{b_1 \ldots b_L\}$
the Euclidean distance between the two vectors is obtained by:

$$d(v_1, v_2) = \sum_{j=[1\ldots l]} d_j(p_j(t_j^{v_1}), p_j(t_j^{v_2}))$$

In this way, the determining step (35) is defined accessing the L re-lookup tables of the exemplar descriptors 111 and by comparing simultaneously each L-portions of the second descriptor 3 in order to define the respective distance. The determining step (35) of the query step 7 provides to determine, for each one of second descriptors 3, a list comprising exemplar descriptors 111 that are arranged for progressive distance.

So, the visual similarity coefficient is performed by considering the exemplar descriptors 111 in said list.

The query step 7 further provides:
  determining matched descriptors 111' by selecting from said list the exemplar descriptors 111 having said distance in visual appearance lower than a predefined first threshold;
  recognizing said object An in the query image 2 as the object tag LOGOi of the determined matched descriptors 111'.

According to one embodiment, when the visual similarity coefficient is the distance between the second descriptor 3 of the subregions Sri with respect to a defined point in the coupled training image Ti, the matched descriptors 111' are determined by considering the exemplar descriptors 111 having minimum distance or a distance ranks above to a predefined first threshold.

It is worth noting that the value of the predefined first threshold, that defines the similarity index between the second descriptors 3 and the exemplar descriptors 111, is fixed according to the requested accuracy of the process 1.

According to one embodiment, the training step 6 further comprises:
  storing (22) the plurality of first descriptors 11 of each training image Ti of the set in a register 5, and
  storing (24) in a exemplars library 8 the determined exemplar descriptors 111.

Thus, the elaborating step (38) comprises:
  extracting from the exemplars Library 8 the object tag LOGOi comprised in the logo-code 12 coupled to the matched descriptors 111';
  recognizing the object An as the extracted object tag LOGOi of the matched descriptor 111'.

In other words, the process 1 recognizes the object An by considering the logo-code 12 coupled to the exemplar descriptors 111 that correspond with highest precision to the second descriptors 3 of the query image 2. Referring to FIG. 2, in an embodiment of the process 1, the training step 6 further comprises:
  filtering (step 28) by a first transformation law the object tag LOGOi by generating a set B of reference object B1 ... Bq;
  coupling the sets B of reference objects B1 ... Bq with at least one of a training image Ti in order to provide (20) said set of training images Ti.

In particular, the first transformation law comprises one or a combination of operations selected from the group of: perspective, scaling, illumination, Gaussian blur, motion blur, compression artifacts.

Moreover, instead of a single object tag LOGOi, a plurality of object tags LOGOi i=1 ... m can be provided, wherein each object tag LOGOi or original logo is different from one to another.

Thus, by applying the first transformation law to each one of said object tags LOGOi a plurality of sets Bi i=1 ... m of reference objects Bi1 ... Biq is generated.

In this way, given the plurality of object tag LOGOi i=1 ... m and chosen random parameters for the combination of the first transformation law, practically an unlimited number of training examples is obtainable.

Figure 5:
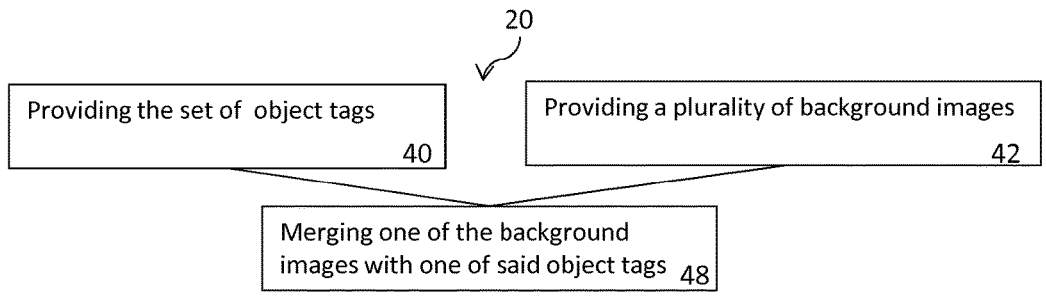
FIG. 5 shows a schematic flow diagram of the process according to the present invention.
Figure 6:
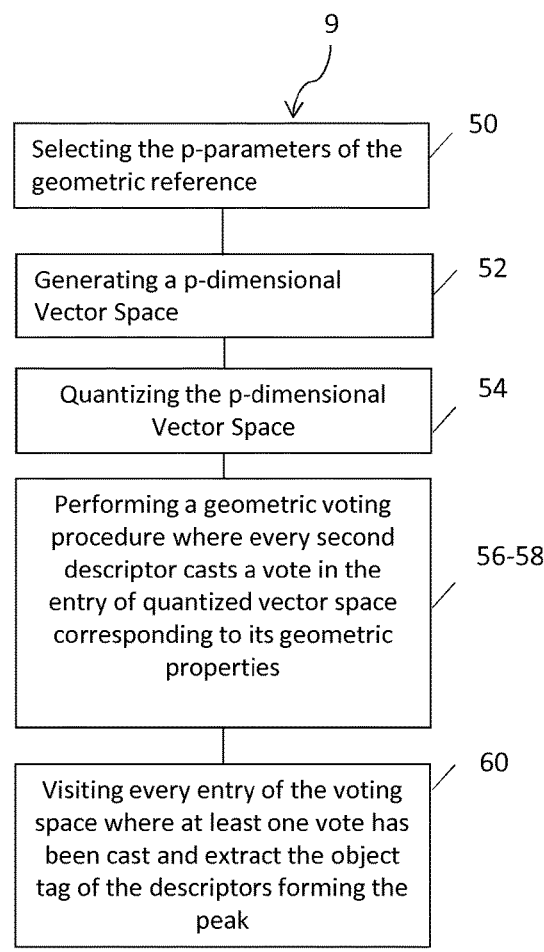
FIG. 6 shows a schematic flow diagram of a testing step of the process according to the present invention.

Referring to FIG. 5, the providing (20) a training image Ti of the training step 6 further comprises:
  providing (40) a set of object tags LOGOi;
  providing (42) a plurality of background images I1, ..., Ix;
  merging (48) the object tags LOGOi of the set with the plurality of background images I1, ..., Ix.

Advantageously, the plurality of background images I1, ..., Ix comprises:
  receiving real images from an user or/and
  downloading artificial images like website images by an interconnected computer network or/and
  providing uniform images having uniform colour backgrounds.

Thus, when it provides the group of sets Bi i=1 ... m of objects tag Bi1 ... Biq, the merging step (48) determines a group of sets Ti i=1 ... m of training images Ti1 ... Tiq by operating an enhancement of the performance of the process 1. In fact, an unlimited amount of training samples enhances the capacity to the training images Ti1 ... Tiq to reflect the real data.

Moreover, it is worth noting that when the set of training image T1 ... Tq is referred to a single object tag LOGOi, the process 1 allows to detect relatively small objects.

According to one embodiment by having more than one object tag LOGOi, the testing step 9 is performed to determine the false positives in respect to the object tag An recognized by the query step 7.

In this case, the storing step (24) of the training step 6 further comprises:
  associating to each exemplar descriptor 111 of said group stored in the exemplars library 8:
    a geometric reference 13 that is representative of a geometric mapping of exemplar descriptor 111 with respect to the object tag LOGOi in the training image Ti;
    a logo-code 12 that comprises the object tag LOGOi of the training image Ti.

According to an embodiment, the geometric reference 13 defines a location attribute of the polygon 15 which encloses the object tag LOGOi in the training image Ti. The polygon 15 being represented from a number p of parameters. The P parameters of said geometric reference 13, when the subregions Sri are circle areas of pixels, can comprise:
  a) the relative distance between a mark point comprises into the enclosing polygon 15 and the centre Cri of the subregion Sri, and
  b) the ratio between the area of the subregion Sri and the area of the enclosing polygon 15.

The testing step 9 comprises:
  selecting (50) in the exemplars library 8 the p-parameters of the geometric reference 13 associated to the polygon 15 of said matched descriptors 111';
  generating (52) a p-dimensional Vector Space, wherein each vector that represents one of the p-parameters of the geometric reference 13 is discretized into a predefined range;
  quantizing (54) the p-dimensional Vector Space by defining a quantized Space.

Moreover, the testing step 9 comprises:
  defining (56) a list of matched descriptors 111' resulting from a geometric voting procedure wherein each one of said second descriptor 3 casts a vote for every p-parameter in the quantized Space according to its geometric reference values. The geometric voting procedure stops when all the second descriptors 3 of the query image 2 have cast their vote.

Thus, the testing step 9 further comprises:

identifying (58) a positive matched descriptors 111' which corresponds to a matched descriptor 111' having a vote value of the p-parameters in the quantized Space that is higher with respect to a predefined second threshold and extracting (60) from the exemplars library 8 the object tag LOGOx associated to said positive matched descriptors 111' and comparing the extracted object tag LOGOi with said recognized object An.

In this way, if the recognised object tag LOGOi obtained by the elaborating step (38) is a false positive it does not correspond to the extracted object tag LOGOx identified by the extracted (58).

According to an embodiment, when the polygon 15 is an oriented rectangle with respect an oriented system XoY, the geometric reference 13 can be 5-parameters:

x and y: the coordinates of the top left corner;
w and h: the width and the height;
a: the rotation angle with respect the XoY.

In this embodiment, for the generating step (52) the 5-dimensional Vector Space is generated and quantized step (54) in order to obtain the quantized Space.

Having the query image 2 of (50×50) pixels, then:

$$x'=y'=[0,10,20,30,40,50];$$

$$w'h'=[10,20,30,40,50];$$

$$a'=[0,\pi/4,\pi/2,(3/4)\pi,\pi,(5/4)\pi,(3/2)\pi,(7/4)\pi,2\pi].$$

The sizes of the quantized Space is:

$$(|x'|*|y'|*|w'|*|h'|*|a'|)$$

According to the geometric voting procedure (56), every second descriptor 3 casts a vote in the quantized Space. From the exemplars library 8, it is extracted the object tag LOGOx associated to one or more matched descriptors 111' identified in the quantized Space and having respectively maximum vote or a number of votes that is higher than the second threshold. Thus, the extracted object tags LOGOx is/are compared to the recognized object An in order to define false positive.

In another embodiment, referring to FIG. 3 and in particular to the images identified by Ti' and 2, having identified the exemplar descriptor 111 in Ti', the second descriptor 3 is projected in the query image 2 with the enclosing polygon 15.

The enclosing polygon 15 has the following 5-parameters:

$$x=2, y=23, w=25, h=10, a=\pi/8$$

Thus, in the above identified quantized Space, the enclosing polygon 15 cast one vote at coordinates:

$$X'=1, y'=3, w'=2, h'=1, a'=1$$

The geometric voting procedure is executed for every second descriptor 3 and the quantized Space is filled with the respective votes.

Method for Selecting the Exemplar Descriptors

According to the present invention, the exemplar descriptors 111 are selected by the following method.

Considering the set T of training images Ti of C classes, the training image Ti associated to class label yi is represented by its set of local features $$X_i = \{x_i^1 \ldots x_i^{Ni}\},$$

where Ni denotes the number of first descriptors 11 that have been extracted.

Given a class y, its positive set is obtained by taking the first descriptors 11 from the associated training images $X_y = U_{yi=y} X_i$, while the first descriptor 11 from the other training images Ti of the set form the negative set of the class y.

The method for selecting does not require any bounding box around the object of the image, thus, the neighbourhood of the object comprises a high proportion of descriptors coming from different positive images, while the descriptors of the negative set are far away. In order to quantify this property it is proposed the calculation of a relationship between the descriptors, according to the average of the descriptor precisions over positions where descriptors from positive images appear for the first time.

In a general form, the method for selecting of the exemplar descriptors 11 in the training step 6 by having the set T of training image Ti comprises:

providing a feature of the object tag LOGOi;
defining distances dj representatives of said feature with respect to a predefined point for each training image Ti of said set T;
selecting said training images Ti having the distances dj that are lower with respect to a predefined first value by defining a group or a class of training images Ti;
defining class group indicator indexes I(k);J(r) representative of the group of the training image Ti;
generating a quantifying index srAP for each first descriptor 11 elaborating said class indicator indexes, I(k) and J(r), and the number of said training images Ti comprised in said group;
selecting as exemplar descriptor 111 the first descriptors 11 having the quantifying index srAP that is higher than a predefined first index tpAP.

In particular, according to an embodiment, the computing to a given feature xil of the training image Ti on said set T, provides:

a) defining the distance dj of the given feature $x_i^l$ in the training image Tj with respect to a predefined point, wherein j≠i and the distance is $dj=\min_{\chi \in x_j} \|\chi - \chi_i^l\|_2$,
b) sorting the (M−1) training images Ti of said set T by increasing distances: j1, . . . , jM−1
c) defining a first class indicator index as I(k)=1 if $yj_t$=yi and else 0,
d) defining a second class index as the cumulative sum of the first class index in the set T of training image Ti, $$J(r)=\Sigma_{k=1}^r I(k)$$

e) quantifying the property of each descriptor as the quantifying index:

$$srAP = \frac{1}{M_{yi}-1} \sum_{k=1}^{M-1} \frac{1}{k} I(k)J(k).$$

Thus, a first descriptor 11 is selected as exemplar descriptor 111 for a given feature if its property srAP is higher than a predefined first index tpAP.

In order to avoid the computing of repetitive visual elements only one first descriptor 11 per each training image Ti is considered, thus the first descriptors 11 coming from the same training image Ti and characterised to be candidate to exemplar descriptors 111 are excluded from the computation.

In this way, the exemplar descriptors 111 are both class-specific and representative of different positive training images Ti.

Figure 7:
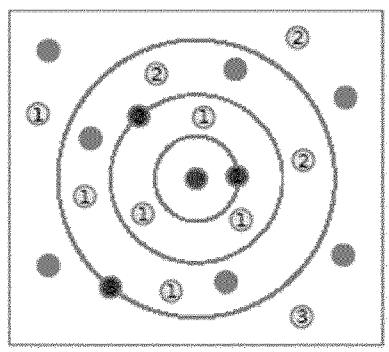
FIGS. 7-10 show reference diagram of a method for selecting the descriptors according to the present invention.

Referring to FIG. 7, the method further provides:

choosing each one of the exemplar descriptors 111 having its quantifying index srAP that is higher than a predefined second index tb;

determining a precision of the exemplar descriptors 111 based on the position of the selected exemplar descriptors 111 in the descriptor space.

In particular, the method provides to mark the descriptor space or feature space by a plurality of balls, each ball with its radius defining a given precision depending on the local density of the class. In particular, the radius of the ball is defined by comprising all the exemplar descriptors 111 having their quantifying index srAP of the property that is higher than a predefined second index tb.

In this way, each exemplar descriptor 111 is associated to its own set of radii depending to the precision.

It is note that, this is different from the prior art classifiers, i.e. NN classifiers based on distances that do not change when travelling across descriptor space.

The plurality of first value index tpAP and the plurality of the second index tb are parameters that are selected in order to define a best accuracy on the training data.

According to an embodiment, the precision of the feature space is defined by means of relationships between the positions of each exemplar descriptor 111 in the feature space, according to the position of the balls.

In particular, the method provides to:

determining which balls each exemplar descriptor falls by comparing the distances to the exemplar descriptor with the radii of the balls.

Moreover, the method provides to apply an identification law, which comprises:

selecting only the smallest determined ball for each exemplar descriptor;

assigning the exemplar descriptor only to the ball having highest precision and in the case wherein two or more balls have the same precision, the contribution of the exemplar descriptor is shared between them equally.

Thus, the method provides to:

determining a ball vote by multiplying the ball precision with the associated exemplar descriptor 111 contributions;

defining the score for an training image Ti in a class by adding the ball votes of all balls, each ball contribution to the score of its class.

Figure 8:
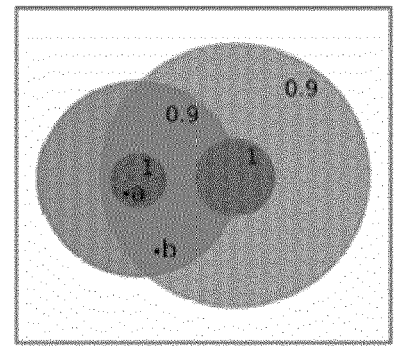

Referring to FIG. 8, it is defined by a training image Ti having two exemplar descriptors, a and b, both fall into two balls. According to the identified law, the exemplar descriptor a is assigned to the dark ball being the ball that has higher precision, having value 1, while the contribution of the exemplar descriptor b is divided between two balls having equal precision of value 0.9.

Advantageously, the method allows to reduce the number of descriptors during the training step 6 by maintaining in the same time a good definition.

In particular, by a product quantization scheme, only k closest points or k-neighbourhood from the set T of training images Ti are used and re-rank them by computing the exact distances. Moreover, when the property srAP is computed for a given exemplar descriptor, if the selected k-neighbourhood does not comprise any descriptor from the positive set, the feature is discarded. Also, the ball radii that correspond to the precision index values are computed in the same k-neighbourhood.

According to an embodiment, the method provides to use the product quantization in order to compute the score for the second descriptor of the query image 2, wherein the exemplar descriptors 111 for all classes compose the exemplars library 8 or database. In this case, for each second descriptor 3 of the query image 2, the product quantization finds the k nearest exemplar descriptors 111 and the exact distances from these shortlisted exemplar descriptors are computed.

It is note that, the method allows to compute the scores for all classes at a constant time cost of querying product quantization and to compute a shortlisted distances. In this way, the addition of new labelled data, performed by adding classes or training images, amounts to adding the newly computed exemplar descriptors into the exemplars library 8.

Figure 9:
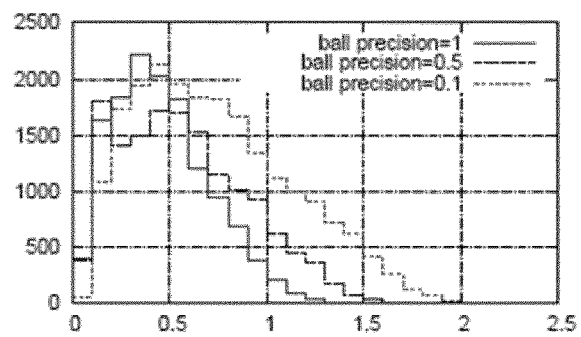

Referring to FIG. 9, as verified by the Applicant, the ball precision or rather the proportion of the class exemplar descriptors inside the ball varies considerably for a given radius. According to the method, balls having the same radius comprise different proportions of exemplar descriptors of the same class that are the descriptor whose degree of confidence is assumed to be captures by the ball precision.

Figure 10:
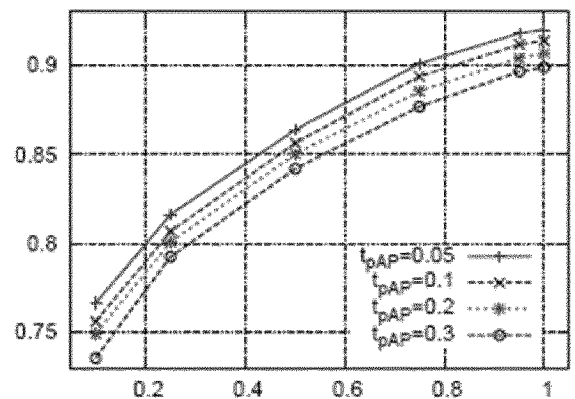

Referring to FIG. 10, it is shown the influence of the predefined first index tpAP and of the predefined second index tb on the accuracy of the method. Better performance can be obtained with low predefined first index tpAP and high predefined second index tb, which correspond to more exemplar descriptors and fewer high precision balls per exemplar descriptor.

The proposed method computes the scores from the similarities between the query features and the class exemplar descriptors, which have been previously selected from all training images. Moreover, the exemplar descriptors are selected independently and are weighted equally allowing an improvement of classification performances. In this way, It is worth noting that the ability of selecting the first descriptors, according to the proposed method, allows to obtain a reliable prediction by reducing the computational analyse.

According to the present invention, the process above indicated for detecting an object in a query image, allows to achieve all prefixed purposes.

While specific embodiments of the inventions have been described and illustrated, such embodiments should be considered illustrative of the invention only and not as limiting the invention as construed in accordance with the accompanying claims.

The invention claimed is:

1. A computer implemented recognition process of an object in a query image, comprising:

performing a training step that comprises:

merging a plurality of background images with an object tag to provide a set of training images, wherein the plurality of background images comprises real images received from a user or/and artificial images like website images downloaded by an interconnected computer network, and wherein each training image comprising a plurality of pixels;

determining for each training image of said set a plurality of first descriptors, each first descriptor being a vector that represents pixel properties in a corresponding subregion of the associated training image; and selecting among the first descriptors a group of exemplar descriptors describing said set of training images, wherein selecting the exemplary descriptors comprises determining the first descriptors having a number of repetitions in the set of training images higher than a certain value;

the method further comprises performing a query step, the query step comprising:

receiving the query image and defining a plurality of second descriptors, the second descriptors being vectors describing pixel properties in corresponding subregions of the query image;

determining visual similarity coefficients based on a comparison between each one of said second descriptors of the query image and each one of said exemplar descriptors;

determining whether second descriptors of the query image match corresponding exemplar descriptors based on the determined visual similarity coefficients; and recognizing the object in the query image based on the determined matches.

2. The process according to claim 1 wherein the training step further comprises:

segmenting each exemplar descriptor of said group in predefined first subvectors;

and the query step further comprises:

segmenting each of said second descriptors by defining second subvectors;

wherein said visual similarity coefficients results from a comparison of the second subvectors of each second descriptor with the first subvectors of each exemplar descriptor.

3. The process according to claim 2, wherein segmenting each exemplar descriptor of said group further comprises:

quantizing each one of said first subvectors and generating respective re-lookup tables;

said visual similarity coefficients resulting by accessing to said re-lookup tables in order to detect the distances between the second descriptors and each one of said exemplar descriptors.

4. The process according to claim 1, wherein the training step comprises generating the object tag by:

providing an original object tag; and filtering by a first transformation law the original object tag.

5. The process according to claim 4, wherein the first transformation law comprises one or a combination of operations selected from the group of: perspective, scaling, illumination, Gaussian blur, motion blur, compression artifacts.

6. The process according to claim 1, wherein the background images have a uniform colour.

7. The process according to claim 1, wherein, for each one of said second descriptors, the query step comprises:

determining a list where said exemplar descriptors are arranged for progressive visual similarity coefficient;

determining the exemplary descriptors matched by corresponding second descriptors of the query image from a selection of the exemplar descriptors in said list based on said visual similarity coefficient;

recognizing said object in said query image based on the selection of the exemplar descriptors in the list.

8. The process according to claim 1, wherein training step further comprises:

storing said group of exemplar descriptor in a exemplars library by associating to each exemplar descriptor the respective pixel property vector (Sift, colour, . . . ), a geometric reference representing a geometric mapping of said exemplar descriptor with respect to said object tag comprised in said training image and a logo-code that comprises the object tag associated to said training image.

9. The process according to claim 8, further comprising a testing step, the testing step comprising:

selecting in said exemplars library the geometric reference associated to the exemplar descriptors matched by corresponding second descriptors of the query image;

generating a p-dimensional Vector Space where P corresponds to the number of the parameters associated to said geometric reference;

determining a list of matched exemplar descriptors resulting from a geometric voting procedure for each second descriptor in said Vector Space;

comparing the object tag associated to at least one of said matched exemplar descriptors in said list with said object recognized during the query step.

10. The process according to claim 8, wherein said geometric reference is defined by a polygon which encloses the object tag in the training image, said polygon being represented from the following parameters:

the coordinate of a top left corner point of the polygon with respect to an original point in said training image;

the width, the height and the angle of said top left corner point with respect to said original point.

11. The process according to claim 1, wherein each one of said first descriptors and/or each one of said second descriptor are vectors that comprise a second transformation law respectively to a corresponding subregion of said training image and to a corresponding subregion of the query image, said second transformation law being a scale invariant features transformation.

12. The process according to claim 1, wherein each subregion is a circle area of pixels and said first descriptors and/or said second descriptors comprise a distribution of pixels properties in said circle area.

13. The process according to claim 1, wherein said selecting of the exemplar descriptors comprises:

providing a feature of the object tag;

determining in each training image of said set distances between each of said plurality of first descriptors and the provided feature;

determining a class resulting from a selection of the first descriptors of said set of training images having associated thereto distances lower than a threshold;

defining class indicator indexes representative of said first descriptors comprised in said class and of said set of training images;

generating a quantifying index for each first descriptor of said class based on an elaboration of said class indicator indexes and on the number of said training images comprised in said class, said quantifying index being indicative of repetitions of the associated first descriptor in the set of training images; and selecting a first descriptor if the associated quantifying index is higher than a predefined first index.

14. The process according to claim 13, wherein selecting said exemplar descriptors further comprises:

choosing the selected exemplar descriptors having their quantifying index higher than a predefined second index;

determining a precision of said chosen exemplar descriptors based on a position of the selected exemplar descriptors in a descriptor space.

15. The process according to claim 1, wherein the object tag is a logo, a brand, a two-dimension image.

* * * * *